A. LUTZE.
MACHINE FOR CUTTING PLASTIC OR PULVERULENT MASSES OF ALL KINDS.
APPLICATION FILED AUG. 1, 1916.

1,224,394. Patented May 1, 1917.

Inventor:
Alfred Lutze
by his Attorney
L. K. Böhm.

UNITED STATES PATENT OFFICE.

ALFRED LUTZE, OF HALLE-ON-THE-SAALE, GERMANY.

MACHINE FOR CUTTING PLASTIC OR PULVERULENT MASSES OF ALL KINDS.

1,224,394. Specification of Letters Patent. Patented May 1, 1917.

Application filed August 1, 1916. Serial No. 112,496.

*To all whom it may concern:*

Be it known that I, ALFRED LUTZE, a citizen of the German Empire, and a resident of Halle-on-the-Saale, Germany, have invented certain new and useful Improvements in Machines for Cutting Plastic or Pulverulent Masses of All Kinds, of which the following is a specification.

My invention relates to machines for cutting plastic or pulverulent masses of all kinds and its particular object is a machine of this kind which allows of being set or adjusted in accordance with the size of the portions to be cut off.

The machines of this kind, which are at present in use, are generally provided with a worm press for pressing the mass into a mouth piece and with a cutter and a die or piston displaceable within said cutter. The cutter is designed to cut a portion of predetermined size from the masses pressed into the mouth piece and in order to facilitate this the die or piston is adjustably arranged within said cutter. According to the position of the die or piston relatively to the mouth of the cutting device the piece cut-off will be longer or shorter. While the cutter and the die are at work, the pressing device in the machines at present in use is constantly working also to crowd the mass together within the mouth piece. By such treatment certain masses such as butter and the like are frequently damaged and therefore some machines of this sort have been provided with pressure regulating devices adapted to stop the pressing device for a while.

In the machine according to the present invention the cutting device as well as the die or piston are set in motion by aid of divided cam pieces allowing to vary their stroke and thereby to vary the size of the portions cut off.

In the drawings affixed to this specification and forming part thereof the preferred form of a machine according to my invention is represented.

Figure 1:
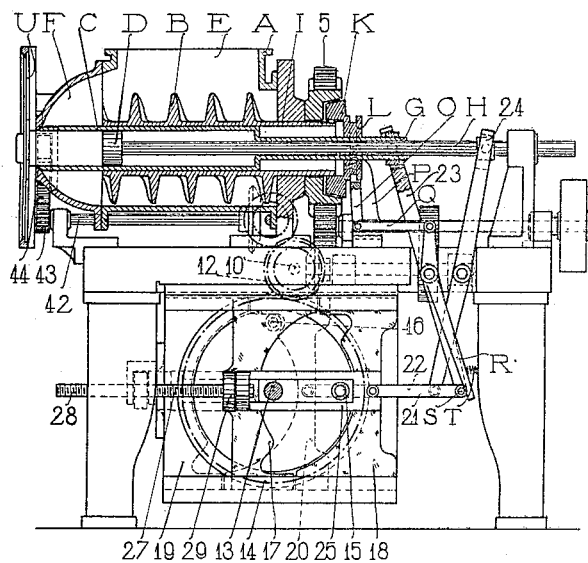
Figure 1 is a front view, partly in section.
Figure 3:
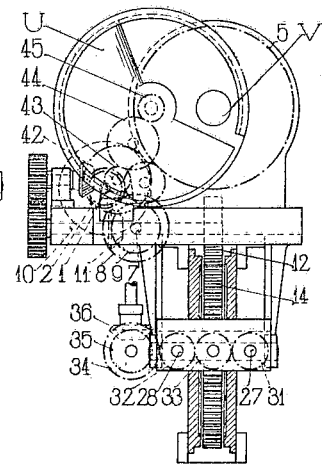
Fig. 3 is a side view, partly in section.
Figure 2:
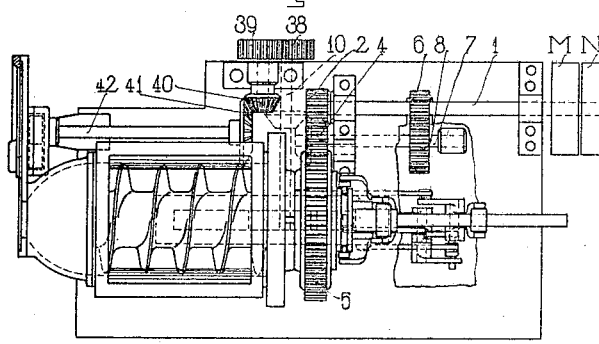
Fig. 2 is a plan.
Figure 4:
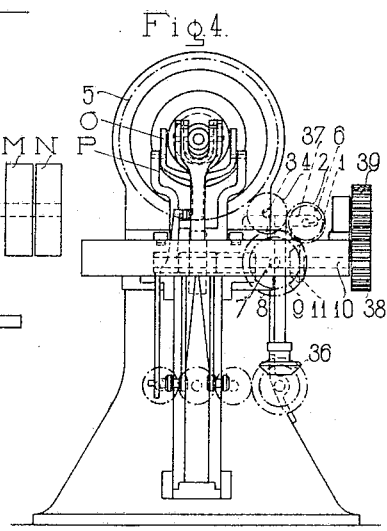
Fig. 4 is a rear view of the machine.
Figure 5:
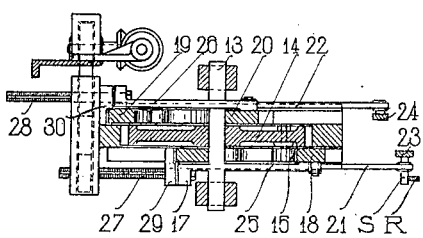
Fig. 5 is a plan of the driving mechanism.

Referring to the drawings, A is the machine casing and B is a worm press rotatably located within said casing. C is a cutter longitudinally displaceable within said worm and D is a plunger or piston adapted to reciprocate within the cutter. When the machine is working, the mass filled in through funnel E is pressed by worm B into mouth piece F. The cutter C in moving forward cuts a portion off the mass, and whenever the cutter has reached its end position (Fig. 1), the plunger D moves forward and throws the cut-off piece out.

As shown the cutter and the plunger execute only longitudinal movements of equal length and the cutter is therefore guided upon the piston rod H by aid of a guide sleeve G. The worm press is preferably driven by a toothed wheel 5 loosely mounted on the hollow shaft I of the worm. The toothed wheel is arranged at the same time to work as a friction clutch, a friction cone K being longitudinally displaceable on the hollow shaft I and secured against rotation by a feather. This clutch on being thrown in by its sleeve L being displaced will join in the rotation of the toothed wheel 5 and transmit this movement of rotation through hollow shaft I to the worm B.

All these movements are derived from pulleys M, N and the main shaft 1, the toothed wheel 5 for instance being caused to rotate by said shaft with the aid of a pinion 2 and a pinion 4, this latter being fixed on an intermediate shaft 3.

The reciprocating movements of the cutter C and the piston D should be variable in length according to the size of the portions to be cut off. In the machine according to this invention the reciprocating movement is imparted to them by means of divided cam slides receiving a reciprocating movement from a cam disk.

In the machine represented in the drawings this cam disk is located in the center plane of the machine and below it. It has the form of a toothed wheel 14 driven by a pinion 12 fixed on a shaft 10, which in turn, is driven by the main shaft 1 with the aid of pinions 6 and 8, the latter pinion being fixed on a counter-shaft 7. By means of bevel wheels 9 and 11 the motion is transmitted to shaft 10. The pinion 14 carries a crank pin 15 on one side and a crank pin 16 on the other side, said pins engaging cam surfaces of the divided disks 17, 18 and 19, 20 respectively. The rotation of the toothed wheel 14 causes the slides to reciprocate in accordance with the configuration of their surfaces, and this reciprocating motion is transmitted by links 21, 22 to oscillating arms 23, 24 designed to cause the cutter and the piston rod to reciprocate. The arms 23, 24 are pivoted by aid of their forked ends to the respective rods, the arm 23 being pivoted to the hollow rod G of the cutter and the arm 24 to the piston rod H.

By dividing the cam slides 17, 18 and 19, 20 respectively in two parts it is possible, by simply varying the relative position of the parts of each slide to vary as well the position of the cutter C and of the piston D relatively to the mouth piece. The two parts of the cam slides are set by aid of rails 25 and 26 fixed to the cam pieces 18 and 20 respectively. Set screws 27 and 28 are screwed upon the ends of said rails said screws being guided in flanges 29 and 30 of the guide pieces 17 and 19 respectively. By turning the screw spindles the cam pieces 17, 18 and 19, 20 can be displaced relatively to each other. Along with this displacement the position of the oscillating arms 23, 24 is varied by aid of the links 21, 22 as well. In order to allow of effecting such a variation of the position of the cutter and piston relatively to the mouth of the mouth piece F and of thereby varying the length of the cut-off shapes also, while the machine is working, gear wheels 31, 32 are arranged on the screw spindles 27, 28, said wheels being connected by an intermediate wheel 33 and being driven by a gear wheel 34. On the axle of the wheel 34 there is arranged a coned wheel 35 gearing with another coned wheel 36 fixed on an axle having its upper accessible end provided with a hand wheel 37. By turning the said hand wheel the screw spindles 27, 28 are also turned.

According to the present invention it is intended to throw the worm press B out as soon as the mouth piece has been sufficiently filled with the mass and the cutter C has cut off a portion from said mass. For this reason also the throwing-in of the cone K of the friction clutch is rendered dependent upon a predetermined position of the cam slide 17, 18 imparting reciprocating movement to the cutter C. An arm O connected with the clutch-sleeve L and pivotally connected to stays P, P is pivoted also, by aid of a link Q, to an oscillating arm R resting with its lower end against a pin S of the link 21. By means of a spring T the arm R is held in its clutch-engaging position. In the machine shown in the drawings, whenever the cutter C approaches its end position, the pin S meets the arm R and pushes it back against the action of the spring T, thus causing the cone K to be withdrawn from the toothed wheel 5 and the driving gear of worm B to be thrown out.

From this moment on the worm B remains ineffective until the cutter C has started on its return way and has released the arm R, which now is caused by the spring T to displace the clutch-sleeve L and to throw in the friction cone K, thus transmitting the continuous movement of rotation of the toothed wheel 5 again to the worm B which now will push fresh material into the mouth piece F.

The worm B may as well be thrown in or out at a less advanced position of the cutter C, according to the position imparted to the oscillating arm R relatively to the pin S. In all cases, along with the variation of the length of the form and of the movement which the cutter C and piston D have to make, also the moment of throwing the worm B out of operation may be varied, and in consequence thereof the time of working of the worm is varied in accordance with the size of the portion to be cut off.

The device for closing the opening of the mouth piece F and for severing the shape cut off by the cutter should also be dependent upon the cutting movement, no matter whether the shape is long or short. To this end a rotatable cutting disk U is eccentrically arranged in front of the opening V of the mouth piece F. The disk U is designed to serve as a cover for the said opening and is cut out so as to present a radial cutting edge. The movement of rotation is imparted to said disk U from the shaft 10 by aid of gear wheels 38, 39, coned wheels 40, 41, the shaft 42 and gear wheels 43, 44, 45. The disk U is continuously rotating and covers the opening V as long as the pressing and cutting devices are working. As soon however as the piston D is beginning to work, it uncovers the opening V, until the piston has reached the end of its course. At this moment the cutting edge of the disk passes across the front face of the piston and in severing the finished shape cleans at the same time the piston face.

I claim:—

1. In a machine of the class described, in combination, a pressing device, a cylindrical cutter, a piston within said cutter, means for operating said pressing device, and cams adapted to impart reciprocating motion to said cutter and said piston, each cam being divided and its parts being adapted to be displaced relatively to each other.

2. In a machine of the class described, in combination, a pressing device, a cylindrical cutter, a piston within said cutter, means for operating said pressing device, and cams adapted to impart reciprocating motion to said cutter and said piston, each cam being divided, and means for displacing and adjusting the parts of the cam relatively to each other.

3. In a machine of the class described, in combination, a pressing device, a cylindrical cutter, a piston within said cutter, means for operating said pressing device, cams adapted to impart reciprocating motion to said cutter and said piston, each cam being divided and its parts being adapted to be displaced relatively to each other, and means for transmitting motion from one part to the cutter and from the other part to the piston.

4. In a machine of the class described, in combination, a pressing device, a cylindrical cutter, a piston within said cutter, means for operating said pressing device, cams adapted to impart reciprocating motion to said cutter and said piston, each cam being divided and its parts being adapted to be displaced relatively to each other, and links operatively connecting one part with said cutter and the other part with said piston.

5. In a machine of the class described, in combination, a pressing device, a cylindrical cutter, a piston within said cutter, means for operating said pressing device, cams adapted to impart reciprocating motion to said cutter and said piston, each cam being divided and its parts being adapted to be displaced relatively to each other, and means for temporarily throwing the pressing device out of operation.

6. In a machine of the class described, in combination, a pressing device, a cylindrical cutter, a piston within said cutter, means for operating said pressing device, cams adapted to impart reciprocating motion to said cutter and said piston, each cam being divided and its parts being adapted to be displaced relatively to each other, means for varying the length of the course of said cutter and said piston by varying the displacement of the parts of the cam, means for temporarily throwing the pressing device out of operation, and means for setting said throwing out means according to the length of the course of said cutter and piston.

7. In a machine of the class described, in combination, a pressing device, a cylindrical cutter, a piston within said cutter, means for operating said pressing device, cams adapted to impart reciprocating motion to said cutter and said piston, each cam being divided and its parts being adapted to be displaced relatively to each other, a rotary cutter in front of the piston face at the end of its forward course, said rotary cutter having a radial cutting edge adapted to pass over the piston face.

8. In a machine of the class described, in combination, a pressing device, a cylindrical cutter, a piston within said cutter, means for operating said pressing device, cams adapted to impart reciprocating motion to said cutter and said piston, each cam being divided and its parts being adapted to be displaced relatively to each other, a mouth piece at the end of said pressing device, a rotary cutter in front of the opening of said mouth piece adapted to close it, said rotary cutter having a radial cutting edge adapted to pass over and clean the front face of said piston at the end of its forward course.

Signed at Leipzig, Germany, this 24th day of May 1916.

ALFRED LUTZE.

Copies of this patent may be obtained for five cents each, by addressing the "Commissioner of Patents, Washington, D. C."